(12) United States Patent
Zwanenburg et al.

(10) Patent No.: US 9,888,811 B2
(45) Date of Patent: Feb. 13, 2018

(54) AIR-BASED FRYER PAN

(71) Applicant: KONINKLIJKE PHILIPS N.V., Eindhoven (NL)

(72) Inventors: Godwin Dirk Zwanenburg, Eindhoven (NL); Janine Willemijn Medema, Eindhoven (NL); Marc Alexander Pastoors, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 39 days.

(21) Appl. No.: 14/895,085

(22) PCT Filed: May 23, 2014

(86) PCT No.: PCT/EP2014/060647
§ 371 (c)(1),
(2) Date: Dec. 1, 2015

(87) PCT Pub. No.: WO2014/195150
PCT Pub. Date: Dec. 11, 2014

(65) Prior Publication Data
US 2016/0120363 A1  May 5, 2016

(30) Foreign Application Priority Data

Jun. 4, 2013 (EP) .................................... 13170411

(51) Int. Cl.
*A47J 37/10* (2006.01)
*A47J 37/06* (2006.01)
(Continued)

(52) U.S. Cl.
CPC ............... *A47J 37/108* (2013.01); *A23L 5/17* (2016.08); *A47J 37/0641* (2013.01); *A23V 2002/00* (2013.01); *A47J 36/02* (2013.01)

(58) Field of Classification Search
CPC ...... A47J 37/108; A47J 37/10; A47J 37/0641; A47J 37/0629; A47J 36/02; A47J 27/13; A47J 27/002; A47J 27/00; A23L 5/17
(Continued)

(56) References Cited

U.S. PATENT DOCUMENTS

| 252,883 | A | * | 1/1882 | Lindner et al. | ......... | A47J 36/20 |
| | | | | | | 220/23.88 |
| 866,911 | A | * | 9/1907 | Burchfield et al. | ..... | A47J 27/60 |
| | | | | | | 220/573.4 |

(Continued)

FOREIGN PATENT DOCUMENTS

| EP | 2181940 A1 | 5/2010 | |
| WO | WO 2005066469 A1 * | 7/2005 | ......... B01D 39/2044 |
| WO | 2012032449 A1 | 3/2012 | |

OTHER PUBLICATIONS

Translation of WO2005066469 (Haerig et al.), Jul. 21, 2005, pp. 2-3.*

*Primary Examiner* — Robert J Hicks

(57) ABSTRACT

An apparatus, pan and method for the preparation of food with hot air including a pan bottom providing a pan surface area for receiving food to be prepared, and side-walls at least partly surrounding the pan surface area, and a mounting connector for temporarily mounting the pan inside a food preparation chamber of an apparatus for preparing food. The pan bottom is provided with a plurality of through-holes as a hot air passage. The through-holes cover approximately 3 to 50% of the flat pan surface area and the heat capacity per area of a bottom surface of the pan bottom is between 10 and 75 $JK^{-1}$ $dm^{-2}$.

14 Claims, 7 Drawing Sheets

(51) Int. Cl.
*A23L 5/10* (2016.01)
*A47J 36/02* (2006.01)

(58) Field of Classification Search
USPC ......... 220/573.1, 573.5, 573.4, 23.88, 23.83, 220/912, 528; 99/447, 446, 339, 417, 99/416, 410, 357
See application file for complete search history.

(56) References Cited

U.S. PATENT DOCUMENTS

| | | | | |
|---|---|---|---|---|
| 1,454,856 | A | * | 5/1923 | O'Brien ............... A23B 7/08 99/348 |
| 4,106,486 | A | * | 8/1978 | Lee ..................... A47J 27/04 126/369 |
| 5,211,105 | A | | 5/1993 | Liu |
| 6,267,046 | B1 | | 7/2001 | Wanat |
| 6,450,085 | B1 | | 9/2002 | Riesselmann |
| 6,546,850 | B1 | * | 4/2003 | Akiyama-Warren ... A47J 36/20 220/573.4 |
| 7,790,213 | B2 | * | 9/2010 | Iakossavas ............. A47J 37/01 426/496 |

* cited by examiner

AIR-BASED FRYER PAN

This application is the U.S. National Phase application under 35 U.S.C. § 371 of International Application No. PCT/EP2014/060647, filed on May 23, 2014, which claims the benefit of European Application No. 13170411.6 filed on Jun. 4, 2013. These applications are hereby incorporated by reference herein.

FIELD OF THE INVENTION

The present invention relates to the preparation of food with hot air, and relates in particular to a pan for a hot air apparatus for preparing food, an apparatus for preparing food, and a method for preparing food with hot air.

BACKGROUND OF THE INVENTION

Food can be prepared by hot air. An example for an apparatus using hot air to prepare food is the Philips air-based fryer. The air-based fryer is an appliance for cooking food, for example fries or chicken, wherein the heat is provided by hot air. In order to heat the food for the preparation purpose, a stream or flow of hot air is moved passing the food to heat the food, respectively the air is blown through the food containing volume for heating purposes. An apparatus like the air-based fryer can be used in the household environment, for example. An apparatus for preparing food with hot air is described in WO 2012/032449 A1. Besides the preparation of fries or chicken with hot air, it has also been shown that, for example, more delicate food such as fish can also be prepared with hot air. However, basket-like structures used for chicken or fries have been shown to provide results of the prepared food, i.e. the prepared fish, that, in terms of quality, i.e. taste and optical appearance, may still be improved.

SUMMARY OF THE INVENTION

Hence, there may be a need to provide an apparatus for preparing food with an enhanced range of quality of the result in relation with the preparation of fish, or other delicate food.

The object of the present invention is solved by the subject-matter of the independent claims. Further embodiments are incorporated in the dependent claims. It should be noted that the following described aspects of the invention apply also for the pan for the hot air apparatus for preparing food, the apparatus for preparing food, and the method for preparing food with hot air.

According to the invention, a pan for a hot air apparatus for preparing food is provided, the pan comprising a pan bottom, side-walls and a mounting connector. The pan bottom is provided for providing a pan surface area for receiving food to be prepared. The side-walls are provided at least partly surrounding the pan surface area. The mounting connector is provided for temporarily mounting the pan inside a food preparation chamber of an apparatus for preparing food. The pan bottom is provided with a plurality of through-holes as a hot air passage. The through-holes cover approximately 3 to 50% of the pan surface area. The heat capacity per area of the projected bottom surface of the pan bottom is between 10 and 75 $JK^{-1}$ $dm^{-2}$.

As an advantage, during the preparation the heat is provided for the food to be prepared in a balanced ratio with respect to, for example cooking fish or meat. For example, a crust can be formed as an optimal result, since a sufficient contact with a hot surface area is provided. In particular, the above given range of the heat capacity per area of the pan bottom ensures that a heat buffer is provided that can be used to heat up the meat or fish to a higher temperature, for example to prepare a better crust. The given range of the through-holes is assuring that the inner side of the food is cooked in an appropriate amount. In other words, the given balance between closed area and area of holes provides a heat transfer distribution that is optimized in view of the preparation of delicate food such as steak or fish.

The heat capacity per area is also referred to as specific heat capacity, or thermal capacity per area. The heat capacity per area may also be referred to as thermal mass.

In an example, the value for the heat capacity per area is in the range of 20-45 $JK^{-1}$ $dm^2$, e.g. 35 $JK^{-1}$ $dm^2$.

The term "approximately" relates to a deviation of up to +/−15% of the given value, for example, +/−10% or +/−5% of the given value.

In an example, the through-holes cover 5 to 25% of the pan surface area. The pan surface area relates to the flat surface area of the pan.

In another example, the hole area of the projected area is provided with a ratio of 8 to 12%, e.g. 10.7%.

In another example, the through-holes cover 10 to 18%, e.g. 16% of the flat pan surface area.

According to an example, the through-holes are provided with a minimum width of approximately 2 mm, and a maximum width of approximately 10 mm.

For example, the width is 3 to 4 mm. In a further example, the width is 5 mm.

In an example, the through-holes are provided with a size of approximately 12 mm×3 mm.

The length of the through-holes is provided in an example with a minimum of 5 mm, for example the length is up to 20 mm or more.

In a further example, the ratio of the length to the width is at least 2:1. For example, the pan is made of aluminum, or an aluminum alloy, and has a thickness of approximately 1.0 to 1.5 mm, e.g. 1.2 mm.

In another example, the pan is made from steel and has a thickness of approximately 0.5 to 1.0 mm, e.g. 0.8 mm.

In an example, the bottom surface is flat. In another example, the pan bottom is provided with a plurality of upwardly projecting ribs arranged in an alternate manner with lower surface portions.

According to an example, the pan bottom is provided with a plurality of upwardly projecting ribs arranged in an alternate manner with lower surface portions, and the through-holes are provided in the lower surface portions.

As an advantage, the hot air can pass through the through-holes, even when food is arranged in the pan, since due to the upwardly projecting ribs, the food is at least mainly resting on the upwardly projecting ribs, and is thus not covering, or at least not to a critical amount, the through-holes in the lower surface portions.

According to an example, two diagonally opposed corners are provided with lowered side-walls corner segments.

When providing diagonally opposed corners with lowered side-walls corner segments, larger food, such as a whole fish, or other longitudinally extending larger pieces of food, i.e. meat or fish, can be arranged and prepared, although ranging across the borders of the pan.

The term "lower" relates to providing at least half of the height of adjacent side-walls portions. In an example, the lower portions are provided with at least less than a third of the height of the surrounding side-walls, i.e. with at maximum a third of the height. According to an example, an outer contour of the pan is provided with a plurality of extensions for abutting to adjacent inner surfaces of a food preparation chamber. At least one lateral recess is provided between the extensions as a secondary hot air passage for supply of hot air from atop to an area below the pan.

The hot air passage provided by the plurality of through-holes may thus be referred to as primary hot air passage.

According to an example, the hot air passage by the plurality of through-holes and the secondary hot air passage are provided in a ratio in a range of approximately 1:1. In an example, the secondary hot air passage is larger than the hot air passage by the plurality of through-holes with a factor of about 2 to 3, e.g. with a factor of 2.3.

For example, 16% of the pan area is provided as through-holes for the primary hot air passage, and the secondary air passage is provided with a cross-section in a size of 20% of the cooking chamber area.

In an example, a food chamber is provided by an enclosing cooking chamber structure with an overall area. The projected surface of the pan for receiving the food is provided in a size of approximately 80% of the overall cooking chamber area. The pan for receiving the food is provided with a floor surface, i.e. a flat surface for supporting the food of approximately 65% of the projected surface. For example, the overall cooking chamber area is provided with a size of 4.10 $dm^2$, the projected surface of the pan with a size of 3.28 $dm^2$, and the floor surface of the pan with a size of 2.14 $dm^2$. The through-holes are provided with a hole area of 0.35 $dm^2$, with holes in a size of 3×12 mm. For example, about 100 holes may be provided.

In an example, the through-holes cover 5 to 20% of the pan surface area. The pan surface area relates to the flat area of the pan.

According to the invention, also an apparatus for preparing food is provided, the apparatus comprising a food preparation chamber, an air movement device, a heating device, and a pan. The food preparation chamber is provided by container surfaces, which at least partly enclose a receiving volume provided for receiving the pan with food to be prepared by a through-streaming of hot air. The air movement device provides a circulating air flow streaming through the food preparation chamber. The heating device is configured to heat the air flow provided by the air movement device. The pan is provided as a pan according to one of the above-mentioned examples. The pan is arranged in the air flow of hot air. Further, food arranged on the pan is prepared by a twofold heating mechanism: i) convection directly via the hot air provided as a hot air passage by the through-holes; and ii) conduction provided by the pan structure heated up by the stream of hot air.

According to a further example, the apparatus comprises an air duct arrangement. An air entry opening for entering of hot air into the receiving volume, and an air discharge opening for exiting of air from the receiving volume are provided. The duct arrangement provides an air flow from the discharge opening via the heating device and the air movement device to the air entry opening.

In an example, the air movement device is configured to provide an air flow rate of approximately 20 l/sec or more in the food preparation chamber. In an example, the heating device is configured to supply heat to the air such that hot air is provided.

The term "hot air" relates to a temperature with a range of approximately 80° C. to 250° C.

The term "through-streaming of hot air" means that the delivery of heat to the food to be prepared is provided by the hot air. Thus, besides reaching the upper surfaces of a food pile, also interior surfaces and spaces of the food piles are reached by the air. The term "food pile" also relates to individual pieces of food, such as fish or steak. The hot air is thus penetrating food, where the food has such structures, like in a pile, and the hot air is thus not only moved around outer boundary of the food with lower speed, but directly heats up the food, i.e. the hot air transmits the heat directly to places of the food.

In an example, the hot air flows with a high velocity and in particular with a high flow rate in the food preparation chamber, for example with the air flow rate of approximately 20 liters per second as a minimum, as mentioned above.

For example, the air movement device is a fan with an air inlet and an air outlet. The fan may thus have an air suction side and an air blowout side.

The fan is provided as a centrifugal fan or as a radial fan.

In a further example, a threefold heating mechanism is provided with iii) radiation provided by the enclosing container surfaces heated up by the stream of hot air.

According to an example, in relation to food arranged on the pan bottom, the heat transfer via the convection is provided with a first ratio and the heat transfer via the conduction with a second ratio. The first ratio and the second ratio are provided in a range of approximately 1/1 to approximately 1/3.

In an example, the heat transfer via the radiation is provided with a third ratio, and the first ratio, the second ratio and the third ratio are provided in a range of approximately 1/1/0.5 to approximately 1/3/0.3. For example, the heat provided by radiation is 15% of the total heat transfer.

According to an example, the two heating mechanisms are exclusively supplied with heat from the heating device.

Other heat sources are not provided. The pan is acting as a heat buffer, for example the pan is made of aluminum, or an aluminum alloy, with a thickness of approximately 1.0 to 1.5 mm, e.g. 1.2 mm.

The apparatus is provided as a high air speed circulation cooking device.

According to an example, the pan is provided with an outer contour that is provided smaller than an inner cross-section of the food preparation chamber forming an air ventilation gap at least along a part of the outer contour to form a secondary hot air passage for supply of hot air from atop to an area below the pan.

The term "relation" refers to the opening size for the air streams. In another example, the relation also considers a correction factor for small openings in the sense that the effective opening size is somewhat smaller for the small openings of the pan.

The form of the pan provides lateral ventilation gaps as the secondary air passages.

In one example, the through-holes are provided as longitudinal slits arranged in parallel lines. In another example, the lines are provided transverse to a connection line of the lowered side-walls corner segments.

According to an example, the apparatus is a desk-appliance apparatus.

The term "desk-appliance" refers to an apparatus that is suitable in particular for household purposes. The apparatus can be placed on different working surfaces, for example in a kitchen, on the table or other working surfaces. The apparatus can also be placed in a shelf or on a cupboard. The desk-appliance relates to an appliance that can be manually moved and carried to different places by a single person. For household purposes, the volume occupied by the appliance is constrained to sizes as small as possible. In an example, the desk-appliance relates to a portable appliance.

In another example, the apparatus is a built-in appliance fixedly provided as installed kitchen equipment.

According to the invention, also a method for preparing food with hot air is provided, comprising the following steps:

In a first provision step, food is provided on a pan in a food preparation chamber.

In a second provision step, a through-streaming of hot air in the food preparation chamber is provided. The through-streaming of hot air in the food preparation chamber is provided, wherein the through-streaming of hot air is provided as a hot air passage through holes in a pan bottom. The heat is affecting the food in a twofold manner: i) convecting heat directly via the hot air; and ii) conducting the heat by the pan structure that is heated up by the stream of hot air. The through-holes cover approximately 3 to 50% of the pan surface and the heat capacity per area of the projected bottom surface of the pan bottom is between 10 and 75 $JK^{-1} dm^{-2}$.

According to an aspect of the present invention, a pan is provided with a structure that allows a proper and improved way of preparing, for example, fish or meat. In particular, the provision of thermal energy is provided by the hot air stream, and also by the hot air stream heating up the pan bottom surface, which for this purpose has a particular thermal capacity, i.e. a particular thermal mass. For example, an air-based fryer that is usually used for preparation of fries or chicken can also be used for the preparation of other more delicate food, such as fish or meat, by using the pan, for example instead of a basket used for fries.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1A:
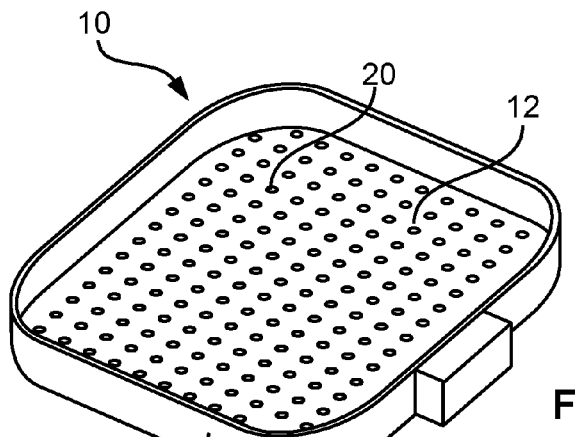
FIG. 1 shows a perspective view of a pan according to an example in FIG. 1A, and a schematic cross-section in FIG. 1B.
Figure 1B:
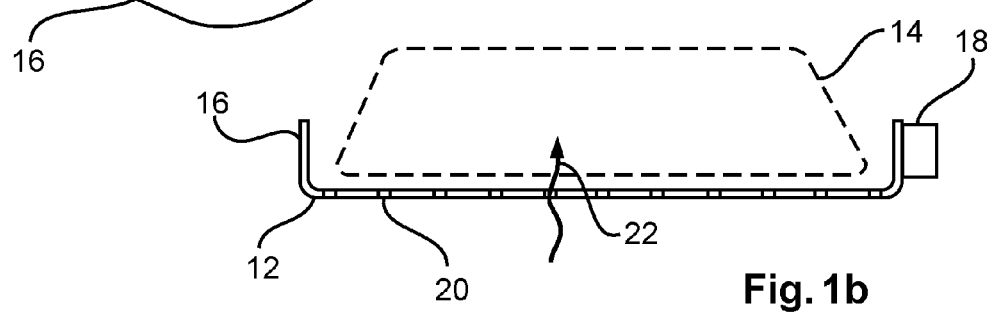

FIG. 1 shows a pan 10 for a hot air apparatus for preparing food (not further shown). The pan 10 comprises a pan bottom 12 providing a pan surface area for receiving food to be prepared. The food is indicated with a dotted line 14 in FIG. 1B showing a cross-section through the perspective view of FIG. 1A. Further, side-walls 16 are provided that at least partly surround the pan surface area. Further, a mounting connector 18 is provided for temporarily mounting the pan inside a food preparation chamber of an apparatus for preparing food. The pan bottom 12 is provided with a plurality of through-holes 20 as hot air passage. An arrow 22 schematically indicates one of the several paths of the hot air passage. The through-holes cover approximately 3 to 50% of the pan surface area, and the heat capacity per area of the projected bottom surface of the pan bottom is between 10 and 75 $JK^{-1} dm^{-2}$. In the shown example, the value for the heat capacity per area is in the range of 20-45 $JK^{-}dm^{-2}$, e.g. 35 $JK^{-1} dm^{-2}$.

For example, the through-holes cover 5 to 25% of the pan surface area. In another example, the through-holes cover 10 to 18%, e.g. 16% of the pan flat surface area.

According to a further example, the through-holes are provided with a minimum width of approximately 2 mm, and a maximum width of approximately 10 mm. In the example, the width is 3-4 mm. The through-holes are provided with a length of up to 20 mm.

For example, the pan is made from aluminum, or an aluminum alloy, and has a thickness of approximately 1.0 to 1.5 mm, e.g. 1.2 mm. In another example, the pan is made from steel and has a thickness of approximately 0.5 to 1.0 mm, e.g. 0.8 mm. As indicated in FIG. 1B, the pan surface 12 is provided to be flat in one example.

Figure 2A:
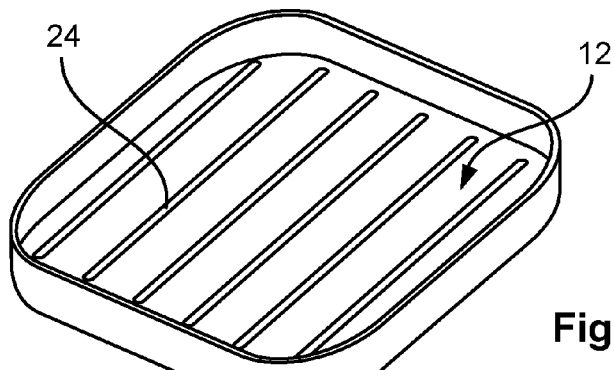
FIG. 2 shows a further example of a pan in a perspective view in FIG. 2A and in a cross-section in FIG. 2B.

FIG. 2 shows a further example, in which the pan bottom 12 is provided with a plurality of upwardly projecting ribs 24. The upwardly projecting ribs 24 are only schematically indicated in FIG. 2A.

Figure 2B:
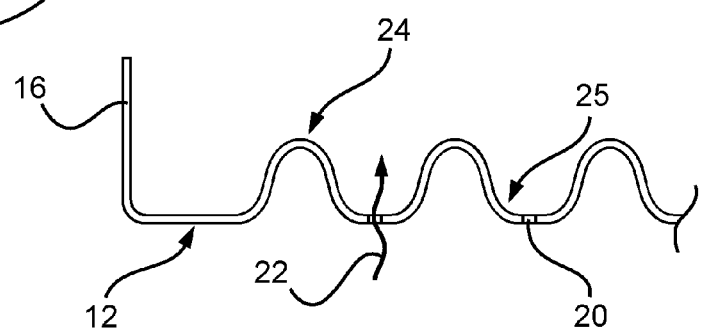

FIG. 2B shows a more detailed view in form of a cross-section of the upwardly projecting ribs 24. As can be seen in FIG. 2B, the projecting ribs 24 are arranged in an alternate manner with lower surface portions 25. The through-holes 20 are provided in the lower surface portions 25.

For example, this provides that hot air can enter the area where the food is located, i.e. the hot air can pass through the pan bottom 12, although, for example, food is arranged on the pan bottom surface. Due to arranging the through-holes 20 in the lower surface portions 25, these through-holes 20 will not be covered, or at least not completely, when arranging food on the pan bottom.

Figure 3:
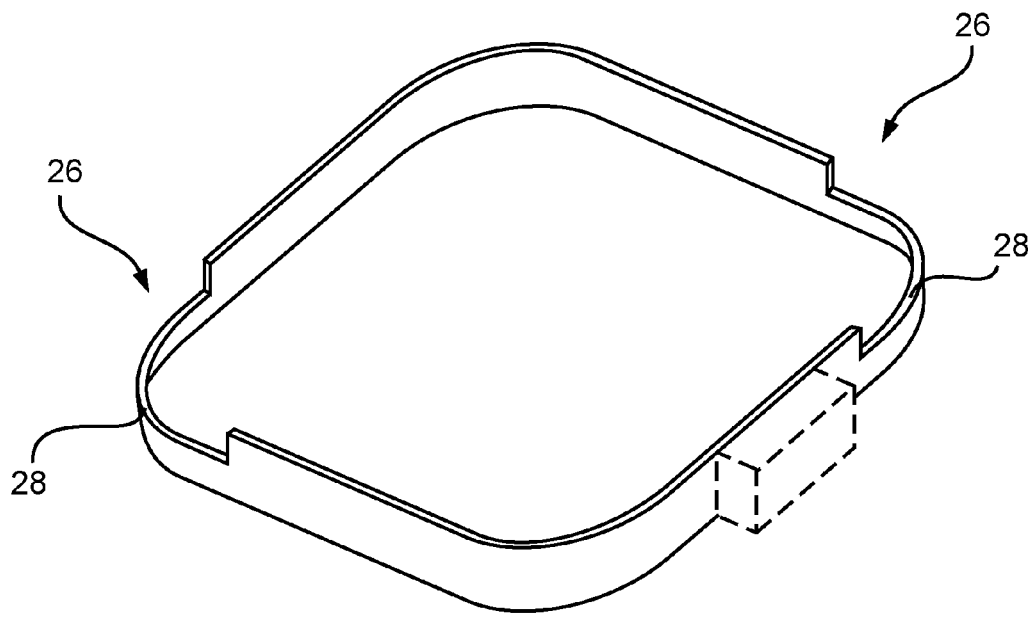
FIG. 3 shows a further example of a pan in a perspective view.

FIG. 3 shows a perspective view of a further example, where two diagonally opposed corners 26 are provided with lowered side-wall corner segments 28. The term "lower" relates to providing at least half of the height of adjacent wall portions. For example, the lower portions are provided with at least less than a third of the height of the surrounding side-walls.

This provides the possibility to arrange food with a larger extension in a longitudinal direction on the pan, for example by having the food arranged such that the end portions are extending across the pan's surface.

Figure 4:
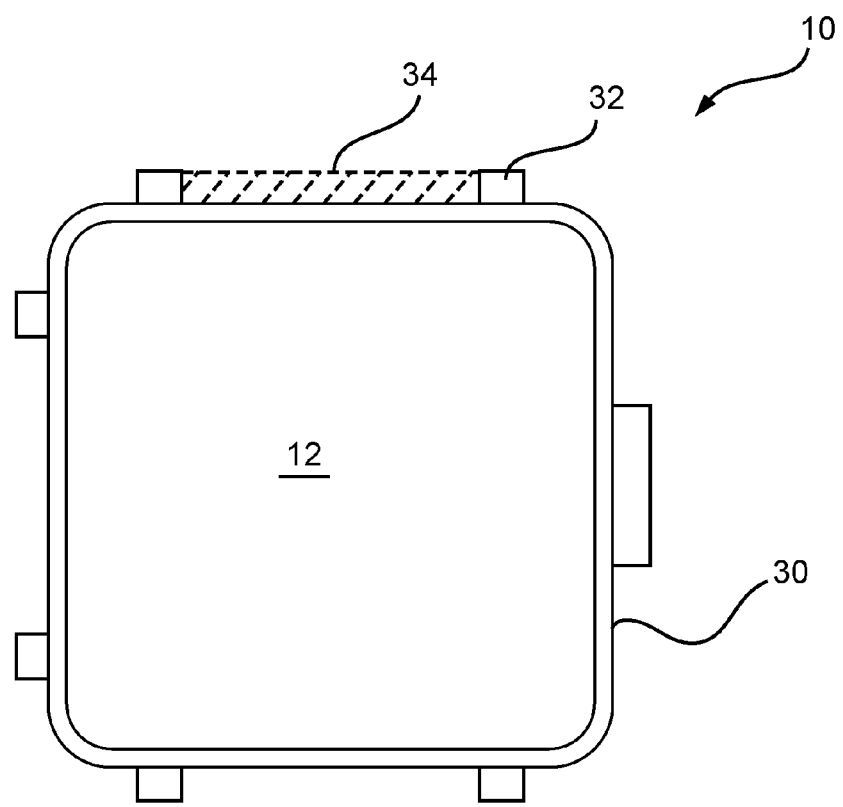
FIG. 4 shows a still further example in a top view.

FIG. 4 shows a top view of a further example of the pan. The pan 10 is provided with an outer contour 30. A plurality of extensions 32 is provided for abutting to adjacent inner surfaces of a food preparation chamber (not shown in FIG. 4). At least one lateral recess 34 is provided between the extensions 32 as a secondary hot air passage for supply of hot air from atop to an area below the pan (not further shown). The lateral recess 34 is schematically indicated with a dotted line structure in FIG. 4 for one portion. Of course, also further lateral recess portions may be provided, as can be seen in FIG. 4.

The secondary hot air passage allows hot air to circumvent the area of the pan to reach the area below the pan bottom 12 in order to provide hot air to the food arranged on the pan bottom 12 by the through-holes. For example, a centrifugal fan is arranged above the food chamber forcing the hot air downwards on the outer circumferential portions of the food chamber.

Figure 5A:
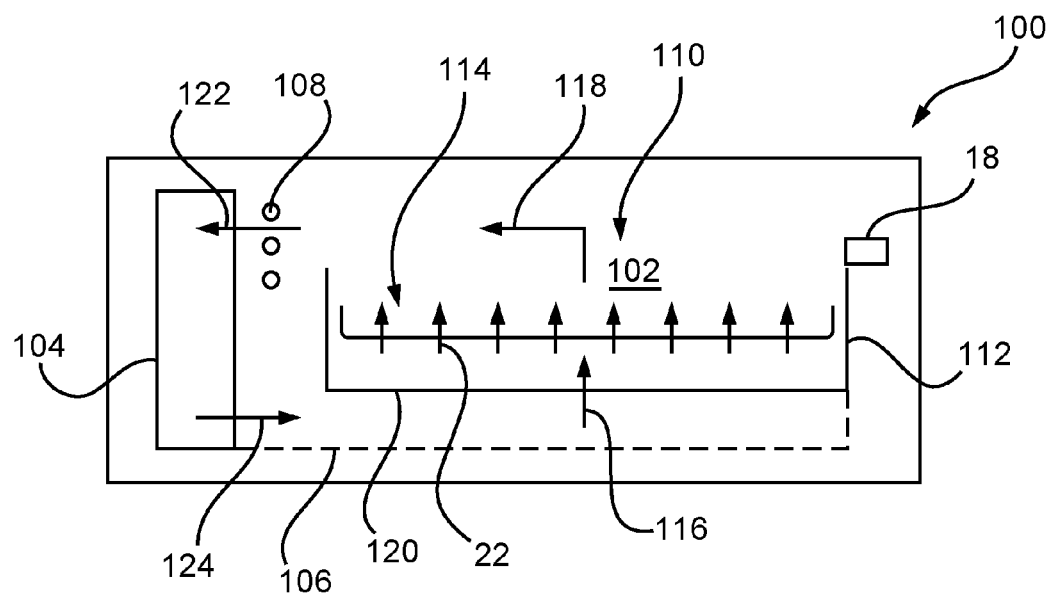
FIG. 5 shows a schematic cross-section through an apparatus for preparing food in an example with an air movement device arranged on the side in FIG. 5A and in an example with an air movement device arranged above in FIG. 5B.

In FIG. 5A, a schematic cross-section through an apparatus 100 for preparing food is provided. The apparatus 100 comprises a food preparation chamber 102, an air movement device 104, an air duct arrangement, indicated with dotted lines 106, a heating device 108, and a pan 110. The food preparation chamber 102 is provided by container surfaces 112, which at least partly enclose a receiving volume 114 provided for receiving the pan 110 with food to be prepared by a through-streaming of hot air. An air entry opening 116 is provided for entering of hot air into the receiving volume 114. Further, a discharge opening 118 is provided for exiting of air from the receiving volume. The air entry opening 116 as well as the air discharge opening 118 are only schematically indicated with a respective arrow. In particular, a bottom surface 120 of the food preparation chamber 102 may be provided with a number of through-holes for providing the air entry opening 116. The air movement device 104 provides a circulating air flow streaming through the food preparation chamber. For example, a first arrow 122 indicates air entering the air movement device 104 and a second arrow 124 indicates an air stream leaving the air movement device 104. The heating device 108 is configured to heat the air flow provided by the air movement device 104. The air duct arrangement 106 provides an air flow from the discharge opening 118 via the heating device 108 and the air movement device 104 to the air entry opening 116. The pan 110 is provided as a pan 10 according to one of the preceding examples. The pan 10 is arranged in the air flow of hot air. Food arranged on the pan 10 is prepared by a twofold heating mechanism: i) convection directly via the hot air provided as a hot air passage by the through-holes, and ii) conduction provided by the pan structure heated up by the stream of hot air.

According to an example, not further shown, in relation to food arranged on the pan bottom, the heat transfer via the convection is provided with a first ratio, and the heat transfer via the conduction with a second ratio. The first ratio and the second ratio are provided in a range of approximately 1/1 to approximately 1/3.

In a further example, the two heating mechanisms are exclusively supplied with heat from the heating device 108.

It must be noted that FIG. 5A shows an embodiment with a laterally arranged fan. However, in a further example, the fan is a centrifugal fan arranged above the food chamber. The air movement path is provided as vertically oriented downward streaming in the outer circumferential portions of the food chamber, and a vertically oriented upward streaming though the food chamber.

Figure 5B:
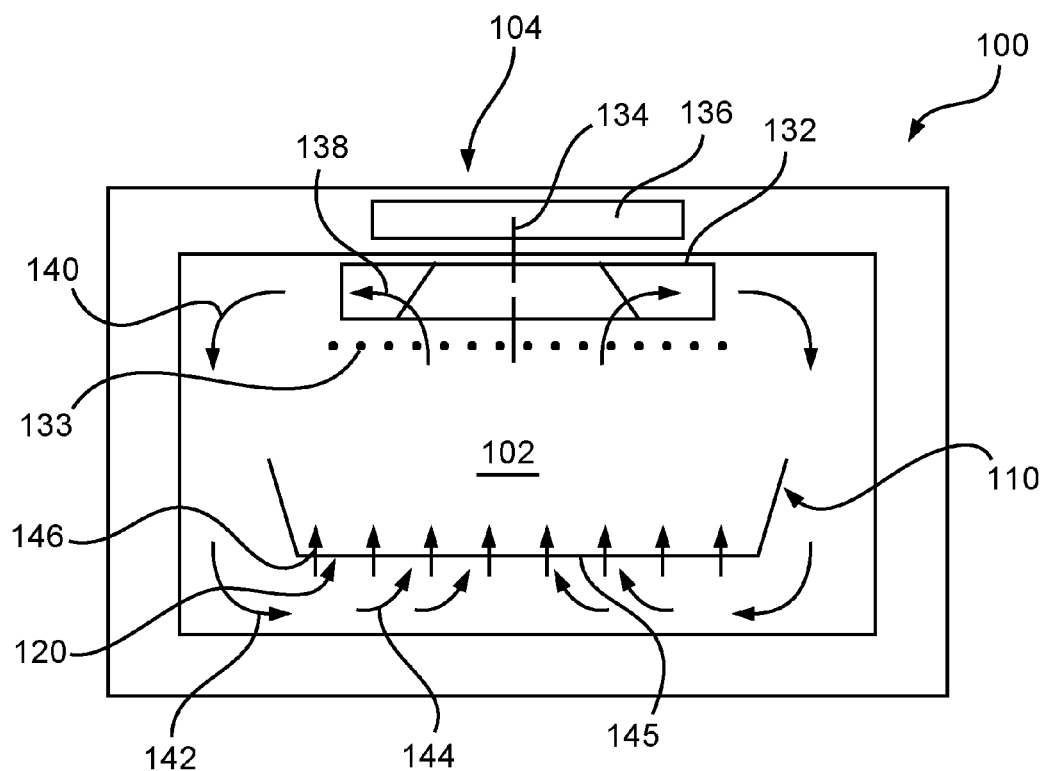

In FIG. 5B, another example of the apparatus 100 for preparing food is shown, comprising the food preparation chamber 102, the pan 110, and a centrifugal fan 132 as the air movement device 104 arranged above the food preparation chamber 102. Heating elements 133 of the heating device 108 are also arranged above the food preparation chamber 102 in front of, i.e. below the centrifugal fan 132. The centrifugal fan 132 is rotating around a vertical axis 134 and driven by a motor 136. The centrifugal fan 132 sucks air from the area of the food preparation chamber 102, as indicated with arrows 138, and blows out air to the side, as indicated with arrows 140. This results in an air stream downwards to the bottom area, where the air is directed towards the bottom surface 120 of the food preparation chamber 102, as indicated with arrows 142 and 144. The airstream then passes the number of through-holes in a bottom 145 of the pan for providing the air entry opening 116, which passing of the air is indicated with a number of arrows 146.

In an example, the apparatus 100 for preparing food comprises the food preparation chamber 102, the air movement device 104, the heating device 108, and the pan 110. The food preparation chamber is provided by the container surfaces 112, which at least partly enclose the receiving volume 114 provided for receiving the pan with food to be prepared by the through-streaming of hot air. The air movement device provides the circulating air flow streaming through the food preparation chamber. The heating device is configured to heat the air flow provided by the air movement device. The pan is provided as a pan according to one of the preceding claims, and the pan is arranged in the air flow of hot air. Further, food arranged on the pan is prepared by a twofold heating mechanism:
i) convection directly via the hot air provided as a hot air passage by the through-holes; and
ii) conduction provided by the pan structure heated up by the stream of hot air.

Figure 6:
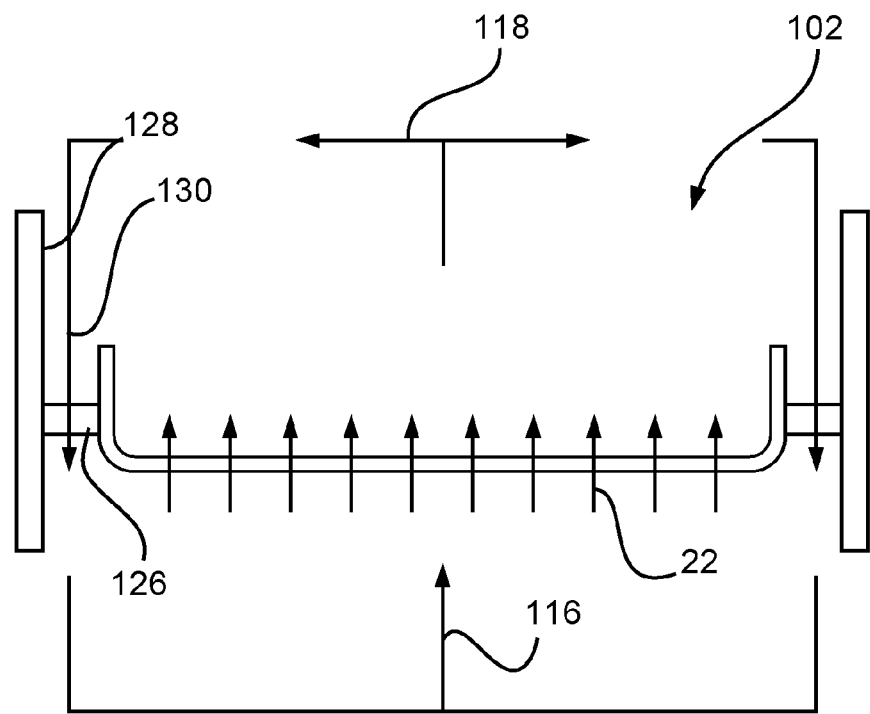
FIG. 6 shows a further cross-section of a further example of an apparatus for preparing food.

According to a further example, shown in FIG. 6, the pan 10 (110) is provided with an outer contour, visible in the cross-section, and indicated with reference character 126, wherein the outer contour 126 is provided smaller than an inner cross-section 128 of the food preparation chamber 102 forming an air ventilation gap 130 at least along a part of the outer contour to form a secondary hot air passage for supply of hot air from atop to an area below the pan.

Figure 7:
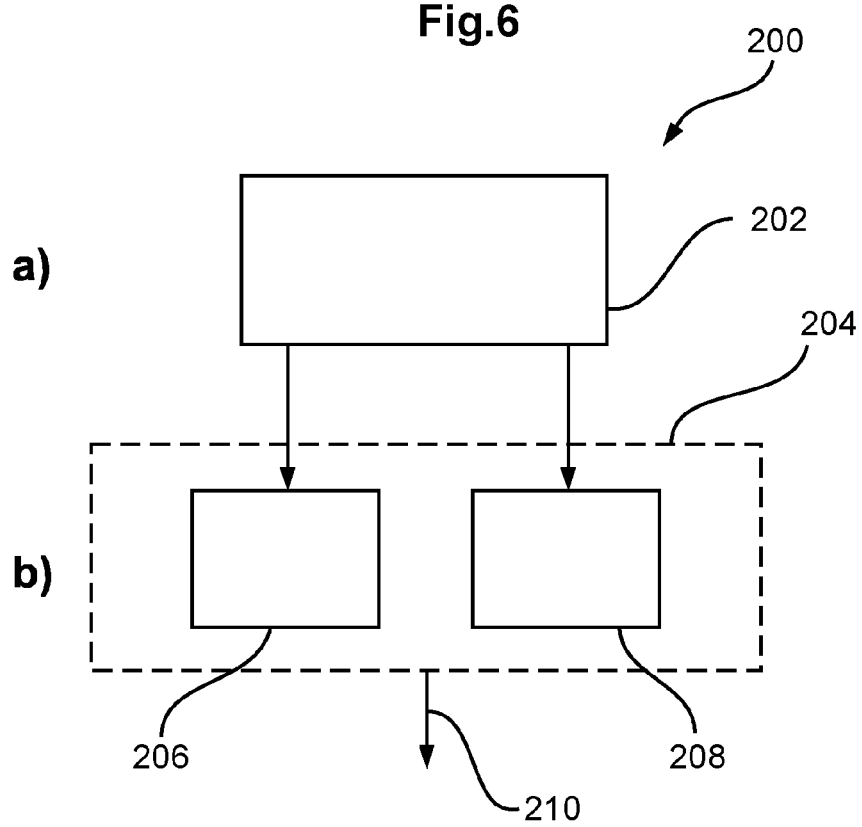
FIG. 7 shows basic steps of an example of a method for preparing food with hot air.

FIG. 7 shows an example of a method 200 for preparing food with hot air. The following steps are provided:

In a first provision step 202, food is provided on a pan in a food preparation chamber.

In a second provision step 204, a through-streaming of hot air in the food preparation chamber is provided. The through-streaming of hot air is provided as a hot air passage through holes in a pan bottom. The heat is affecting the food in a twofold manner: i) a convection 206 of heat directly via the hot air is provided; ii) a conduction 208 of heat by the pan structure is provided, wherein the pan structure is heated up by the stream of hot air. Further, an arrow 210 indicates the possible arrangement of further steps.

The first provision step 202 is also referred to as step a) and the second provision step 204 is step b). A dotted frame for the provision step 204 indicates that the first and the second sub-step, i.e. the convection 206 and the conduction 208, do belong to the same step b).

Figure 8A:
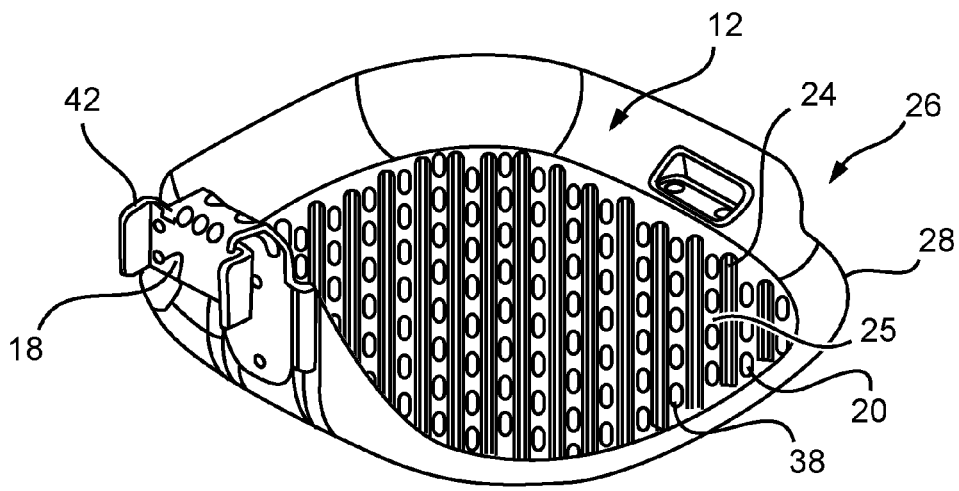
FIG. 8 shows a further example of a pan in a perspective view in FIG. 8A, in a top view in FIG. 8B, and in a side view in FIG. 8C.

A further example of the pan 10 is shown in FIG. 8A in a perspective view. As can be seen, the mounting connector 18 is provided on one of the side portions. Further, the pan bottom 12 is provided with a rib structure 36 and a through-hole structure 38 in-between the ribs of the rib structure 36. Further, the two diagonally opposed corners 26 are shown with lowered side-walls corner segments, for allowing, for example, to provide the possibility for arranging larger pieces of food to be prepared in the pan.

Figure 8B:
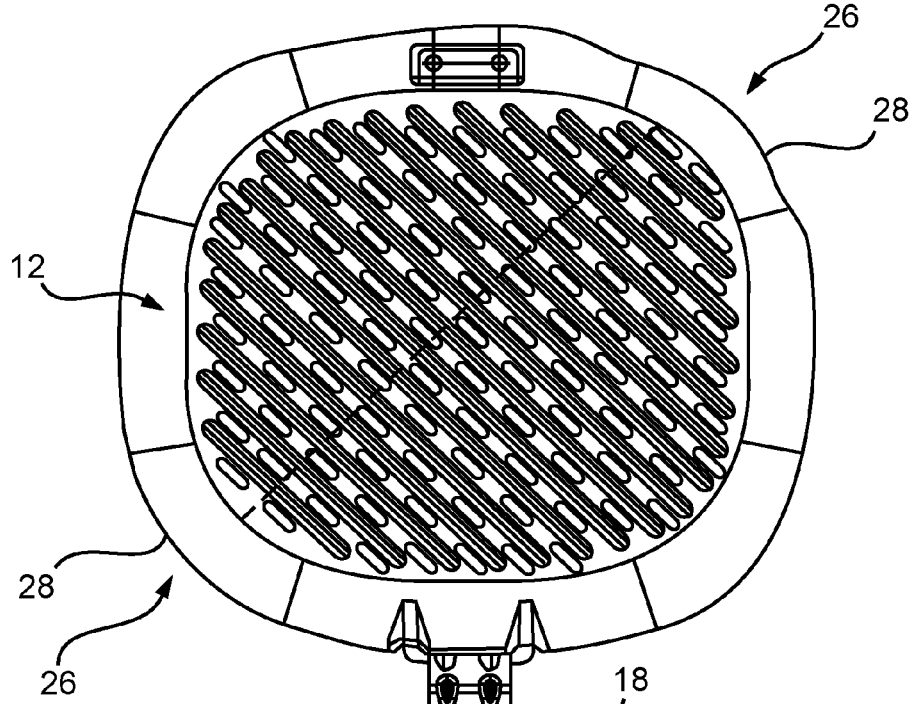
Figure 8C:
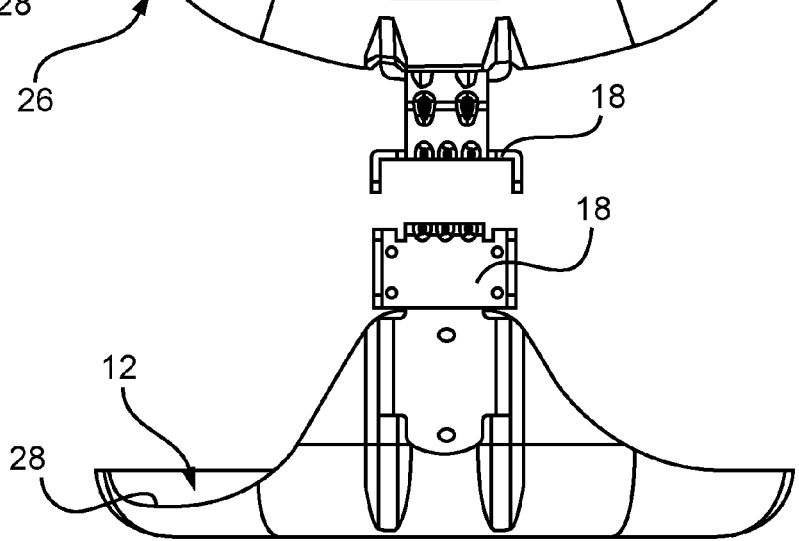

FIG. 8B shows the top view, and FIG. 8C shows a side view from the side having the mounting connector 18 arranged on an extended middle portion 40 of one of the side-walls.

According to a further example, the pan 10 (110) is a fish pan for an air-based fryer. The fish pan may be provided for cooking fish, but also for cooking meat. By the provision of the above-mentioned ratio of through-holes covering a certain amount of the pan surface area, and by providing the pan bottom 12 with a thermal mass in the given range, a sufficient contact of the food to be prepared with a hot surface area is provided for ensuring a proper preparation of the food. Further, the diagonally opposed lower segments of the side-wall portions provide an optimized shape with respect to, for example, the preparation of a whole fish as a larger piece of food to be prepared. The, for example, metal sheet surface of the pan bottom 12 is provided to create a heat buffer that can be used to heat up the fish or meat to a higher temperature, for example for a better crust forming. The holes are there to assure the cooking of the inner side of the food. Ribs, as an option, are provided to create barbecue stripes, and also to provide through-hole openings uncovered. The above-mentioned balance between closed areas and area of holes provides the basis for a proper preparation of, for example, fish.

According to an example, a pan suitable for use in a high speed air circulating cooking device like an air-based fryer or flavor wave is provided. The pan is provided having holes that cover 3 to 40% of the surface area, or more specific 5 to 25%, e.g. 16% of the area of the flat surface area, or of the area covered by a rib structure. Preferable, the hole area is divided over many holes. The pan is provided with sides going upwards to prevent food falling off the pan. The two cutouts in the opposite corners allow the cooking of bigger fishes, for example.

Figure 9:
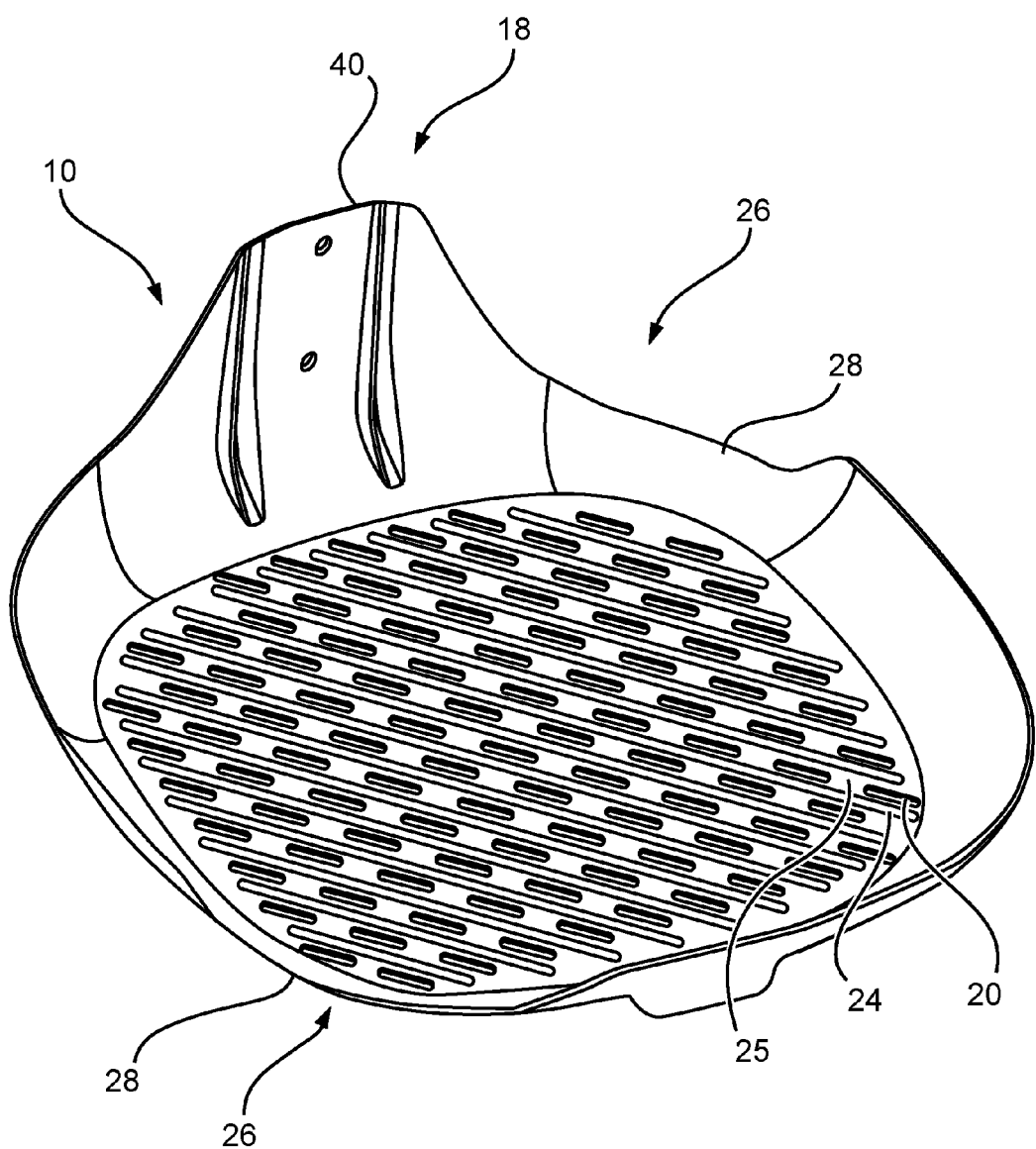
FIG. 9 shows a perspective view of a further example of a pan.

FIG. 9 shows a perspective view of a pan in a further example. The two diagonally opposed corners 26 are shown with the lowered side-walls corner segments 28. The upwardly projecting ribs 24 are arranged in a longitudinal manner parallel to each other, wherein the orientation of the upwardly projecting ribs 24 is transverse to a connection line of the diagonally opposed corners 26. In the example of FIG. 9, the through-holes 20 have a longitudinal shape and are displaced from each other with a closed surface portion in the lower surface portions 25. It is noted that in another example, the through-holes 20 have a different shape, such as small circular shapes, or longer longitudinal shapes, or square shapes, such as rectangular shapes. Still further, the displacement of the through-holes is also provided in a different manner, for example with a larger segment being closed, or a smaller segment.

As can be seen further, the mounting connector 18 is only shown with an extended portion 40 for connection with an adapter configuration 42, as shown in FIGS. 8A, 8B, and 8C.

Figure 10:
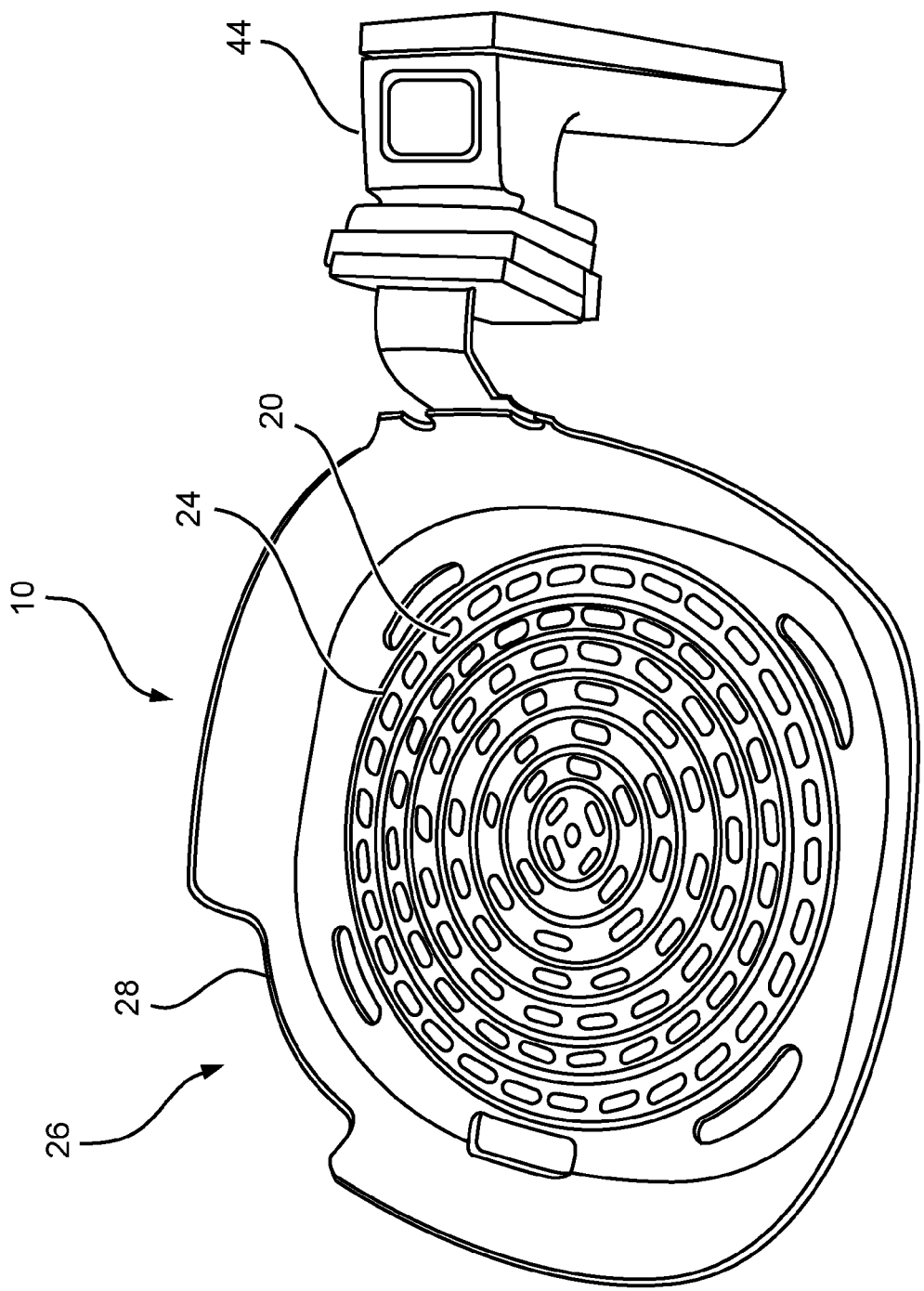
FIG. 10 shows a further example of a pan in a perspective view.

The mounting connector 18 may be connected with a handle 44, as shown in FIG. 10.

FIG. 10 shows a further example of the through-holes 20, the upwardly projecting ribs 24 and the lower surface portions 25 being arranged in a concentric manner, wherein the upwardly projecting ribs 24 are provided as continuous circles.

In a further example, not further shown, the upwardly projecting ribs 24 are provided as circular segments with interruptions with respect to the upwardly projecting parts.

In a still further example, the upwardly projecting ribs 24 are provided in a longitudinal manner, similar to the ribs shown in FIG. 9, however with interruptions of the longitudinal ribs, i.e. the ribs are provided as several segments.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A pan for a hot air apparatus for preparing food, comprising:
a pan bottom providing a pan surface area for receiving food to be prepared;
side-walls at least partly surrounding the pan surface area; and
a mounting connector for mounting the pan inside a food preparation chamber of an apparatus for preparing food;
wherein the pan bottom is provided with a plurality of through-holes as a hot air passage;
wherein the through-holes cover approximately 3 to 50% of the pan surface area; and
wherein a heat capacity per area of a bottom surface of the pan bottom is between 10 and 75 $JK^{-1}$ $dm^{-2}$.

2. The pan according to claim 1, wherein the through-holes are provided with a minimum width of approximately 2 mm, and a maximum width of approximately 10 mm.

3. The pan according to claim 1, wherein the pan bottom is provided with a plurality of upwardly projecting ribs arranged in an alternate manner with lower surface portions, and
wherein the through-holes are provided in the lower surface portions.

4. The pan according to claim 1, wherein two diagonally opposed corners are provided with lowered side-wall corner segments.

5. The pan according to claim 1, wherein an outer contour of the pan is provided with a plurality of extensions for abutting to adjacent inner surfaces of a food preparation chamber; and
wherein at least one lateral recess is provided between the extensions as a secondary hot air passage.

6. The pan according to claim 5, wherein the hot air passage by the plurality of through-holes and the secondary hot air passage are provided in a ratio in a range of 1:1 to 1:3.

7. An apparatus for preparing food, comprising:
a food preparation chamber;

an air movement device;
a heating device; and
a pan including a pan bottom providing a pan surface area for receiving food to be prepared, side-walls at least partly surrounding the pan surface area, and a mounting connector for mounting the pan inside a food preparation chamber of an apparatus for preparing food, wherein the pan bottom is provided with a plurality of through-holes as a hot air passage, wherein the through-holes cover approximately 3 to 50% of the pan surface area, and wherein a heat capacity per area of a bottom surface of the pan bottom is between 10 and 75 $JK^{-1}$ $dm^{-2}$;
wherein the food preparation chamber is provided by container surfaces, which at least partly enclose a receiving volume provided for receiving the pan with food to be prepared by a through-streaming of hot air;
wherein the air movement device provides a circulating air flow streaming through the food preparation chamber;
wherein the heating device is configured to heat the air flow provided by the air movement device;
wherein the pan is arrangeable within the receiving volume in the air flow of hot air; and
wherein the apparatus is configured for preparing food arranged on the pan by a twofold heating mechanism including:
convection directly via the hot air provided as a hot air passage by the through-holes; and
conduction provided by the pan structure heated up by the stream of hot air.

8. The apparatus according to claim 7, further comprising:
an air duct arrangement including an air entry opening for entering of hot air into the receiving volume, and an air discharge opening for exiting of air from the receiving volume;
wherein the air duct arrangement is configured to provide an air flow from the discharge opening via the heating device and the air movement device to the air entry opening.

9. The apparatus according to claim 7, wherein in relation to food arranged on the pan bottom, the heat transfer via the convection is provided with a first ratio, and the heat transfer via the conduction with a second ratio; and
wherein the first ratio and the second ratio are provided in a range of approximately 1/1 to approximately 1/3.

10. The apparatus according to claim 7, wherein the two heating mechanisms are exclusively supplied with heat from the heating device.

11. The apparatus according to claim 7, wherein the pan is provided with an outer contour that is provided smaller than an inner cross-section of the food preparation chamber forming an air ventilation gap at least along a part of the outer contour to form a secondary hot air passage for supply of hot air from atop to an area below the pan.

12. The apparatus according to claim 7, wherein the apparatus is configured as a desk-appliance.

13. The apparatus according to claim 7, wherein the apparatus is configured as a built-in appliance.

14. A method for preparing food with hot air, the method comprising acts of:
providing food on a pan including a pan bottom with a plurality of through-holes as a hot air passage; wherein the through-holes cover approximately 3 to 50% of the pan surface area; and wherein a heat capacity per area of a bottom surface of the pan bottom is between 10 and 75 $JK^{-1}$ $dm^{-2}$;
positioning the pan in a food preparation chamber;
providing a through-streaming of hot air in the food preparation chamber; wherein the through-streaming of hot air is provided as a hot air passage through the plurality of through-holes; and
wherein heat is applied to the food in a twofold manner:
convecting heat directly via the hot air via the plurality of through-holes; and
conducting heat by the pan structure that is heated up by the stream of hot air.

\* \* \* \* \*